United States Patent [19]

Thiele et al.

[11] Patent Number: 5,443,573
[45] Date of Patent: Aug. 22, 1995

[54] GUIDE MEANS FOR TELESCOPING CYLINDRICAL PARTS AND A COLUMN UNIT COMPRISING SUCH GUIDE MEANS

[75] Inventors: Harry Thiele, Saarburg; Rainer Neuer, Fachbach; Hans-Josef Hosan, Neuwied, all of Germany

[73] Assignee: Stabilus GmbH, Koblenz, Germany

[21] Appl. No.: 131,466

[22] Filed: Oct. 4, 1993

[30] Foreign Application Priority Data

Oct. 5, 1992 [DE] Germany ............... 42 33 407.1

[51] Int. Cl.6 ............... F16F 5/00; F16M 11/00
[52] U.S. Cl. ............... 267/64.12; 267/64.11; 248/161
[58] Field of Search ............ 267/64.12, 64.26; 188/300, 322.16, 322.17; 248/161, 631; 297/344.19

[56] References Cited

U.S. PATENT DOCUMENTS

| | | | |
|---|---|---|---|
| 4,756,496 | 7/1988 | Hosan et al. | 248/161 |
| 4,848,524 | 7/1989 | Hosan et al. | 188/322.17 |
| 4,899,969 | 2/1990 | Bauer et al. | 248/161 |
| 4,940,202 | 7/1990 | Hosan et al. | 297/344.19 |
| 5,131,615 | 7/1992 | Hosan et al. | 248/161 |
| 5,161,786 | 11/1992 | Cohen | 267/64.12 |
| 5,188,345 | 2/1993 | Siegner et al. | 267/131 |
| 5,284,312 | 2/1994 | Dony | 248/161 |
| 5,301,777 | 4/1994 | Haudke | 188/322.17 |

FOREIGN PATENT DOCUMENTS

| | | | |
|---|---|---|---|
| 0441267 | 8/1991 | European Pat. Off. | |
| 0511500 | 11/1992 | European Pat. Off. | |
| 0849104 | 11/1939 | France | 267/64.26 |
| 8800976 | 6/1989 | Germany | |
| 2165618 | 4/1986 | United Kingdom | |
| 9312362 | 6/1993 | United Kingdom | 188/322.17 |

Primary Examiner—Robert J. Oberleitner
Assistant Examiner—Chris Schwartz
Attorney, Agent, or Firm—Brumbaugh, Graves, Donohue & Raymond

[57] ABSTRACT

According to an illustrative example, a gas spring (8) is provided within a base tube (9) of a chair column. The piston rod (8-2) of the gas spring (8) is axially supported on a bottom (22) of the base tube (9). The cylinder (8-1) of the gas spring (8) is axially and rotatably guided within a guide (1) at the upper end of the base tube (9). The guide (1) comprises a main sleeve body (2) and a guiding sleeve body (3a) inserted into a central passage of the main sleeve body (2). These sleeves are provided on their surfaces facing each other with at least one projection, and/or at least one recess which engage each other in a snap fit.

20 Claims, 4 Drawing Sheets

GUIDE MEANS FOR TELESCOPING CYLINDRICAL PARTS AND A COLUMN UNIT COMPRISING SUCH GUIDE MEANS

BACKGROUND OF THE INVENTION

The present invention relates to a guide means for telescoping cylindrical parts, especially of a randomly blockable gas spring, whose cylindrical outer face is slidingly arranged within a guiding sleeve unit which is connected to a base tube, said guiding sleeve unit comprising a main sleeve body, wherein at least one guiding sleeve body is arranged.

STATEMENT OF THE PRIOR ART

Such guide means have already become known (e.g. from German Utility Model 88 00 976). In these guide means, the guiding sleeve unit for a gas spring comprises a central bracing tube wherein guiding sleeve bodies are arranged in spaced relationship with respect to each other, both said bracing tube and said guiding sleeve bodies being surrounded by a carrying bush. The guiding sleeve bodies are held within the bracing tube by force fit or tight fit: consequently, there is principally involved a premounted one-piece guiding sleeve unit which entails the disadvantage that, when assembled, corresponding refinishing operations become necessary and that expensive, precise component parts are required in order to achieve tight fit or force fit.

Furthermore, there have become known guide means (e.g. from German 'Offenlegungsschrift' 36 27 138 and the corresponding U.S. Pat. No. 4,848,524) comprising a guiding sleeve unit pressed into the base tube. The guiding sleeve unit includes a receiving bush with at least one joint bush being located therein and being angularly movable within a corresponding groove; this joint bush consists substantially of a non-elastic material. The joint bush carries a bearing bush and is mounted to have clearance to the blockable gas spring displaceably arranged within the bearing bush. For functional efficiency reasons, such clearance cannot be established within desired limits at low cost. Too large a clearance entails the disadvantage that the user gets an unpleasant feeling and that the chair column tends to cause noises.

OBJECT OF THE INVENTION

It is an object of the present invention to provide a guide means for telescoping cylindrical parts with an easily mountable guiding sleeve body which cooperates with the displaceable cylindrical parts without axial and radial play and with low friction.

SUMMARY OF THE INVENTION

For achieving this object, the present invention suggests that the main sleeve body and the guiding sleeve body are provided on their surfaces facing each other with at least one projection and/or at least one recess engaging each other.

Moreover, it is of advantage that a guiding sleeve body is inserted at the upper and lower end of the main sleeve body, the projections and recesses thereby forming a simple plug connection in order to fasten the guiding sleeve bodies in the axial direction. One may use simple low-cost injection-moulded parts so that not only the number of component parts is reduced but also a simple and fast mounting becomes possible. The guiding sleeve bodies have such dimensions that the guiding sleeve unit consisting of the main sleeve body and the guiding sleeve bodies can be pressed into a metal base tube.

It is another essential feature of the present invention that in case of employment of more than one projection and/or recess these projections and recesses are peripherally distributed over the respective sleeve body.

An especially preferred embodiment provides that the main sleeve body has only recesses and the guiding sleeve bodies have only projections. This entails the advantage that the guiding sleeve bodies have no interruptions at all on their entire bearing faces so that a precalibration of the inner diameter of the guiding sleeve bodies is possible.

An especially preferred embodiment provides that the recesses are provided in an axial front area of the main sleeve body.

Another essential feature provides that, when seen in mounting direction, the projections have a face of steadily enlarging diameter. This face begins at the outer diameter of the guiding sleeve body and enlarges correspondingly so that these faces serve as entry guide slopes during the mounting operation by first forming a radially inwardly directed bend and then springing back to their normal position after having reached the recesses. Such a spring catch connection can no longer be loosened after insertion of the gas spring in its assembled state.

To ensure an axial lock to the outside, the present invention suggests that on the side opposite to the mounting direction the projections have a face extending approximately perpendicular to the axis of the bearing.

According to an especially preferred embodiment, the main sleeve body and the guiding sleeve body consist of different materials. It is advantageous to make the guiding sleeve bodies from a material from which antifriction sliding bearings are made. By using exclusively plastic materials for the guiding sleeve bodies and the main sleeve body, a back-lash-free and low-friction guidance is achieved to guide the gas spring axially, radially and rotationally.

Another preferred embodiment suggests that the guiding sleeve body has been precalibrated. Thereby, the assembling operation will be easy and quick; the spring catch connection as a whole can be pressed into the metal base tube, and no refinishing operations will have to be done.

According to a further aspect, the present invention refers to a column unit comprising a base tube having an axis, a first end and a second end. Support means are provided adjacent the second end. A height adjusting unit is provided partially inside the base tube. This height adjusting unit has a first height adjustment component extending along the axis inward and outward of the first end of the base tube and further has a second height adjustment component axially movable with respect to the first height adjustment component. The second height adjustment component is lockable in selected axial positions with respect to the first height adjustment component. The second height adjustment component is substantially axially fixed with respect to the support means. The first height adjustment component has a substantially cylindrical external surface along at least a part of its axial length. The base tube is provided adjacent its first end with a guiding sleeve unit. The first height adjustment component is slidingly guided for at least one of axial and rotational movement by the guiding sleeve unit. The guiding sleeve unit comprises a main sleeve body and at least one guiding sleeve body substantially radially inside of the main sleeve body and slidingly engaging the cylindrical external surface of the first height adjustment component. The at least one guiding sleeve body is axially secured with respect to the main sleeve body by snapping engagement means of the main sleeve body and the guiding sleeve body snappingly engaging each other in response to axial positioning of said guiding sleeve body with respect to the main sleeve body.

The column unit is preferably used as a height-adjustable chair column unit. The height adjusting unit is preferably a hydraulically or pneumatically lockable unit, such as a gas spring, which gas spring comprises a cylinder, a piston rod, a piston member connected with the piston rod inside the cylinder, a pair of working chambers on both sides of the piston member inside the cylinder and a flow passage connecting the working chambers with a valve unit permitting to selectively open or close said flow passage. Such a gas spring is e.g. shown in DE-OS 36 27 138 and the corresponding U.S. Pat. No. 4,848,524. Further, hydropneumatic units may be used as height adjustment units in which liquid filled working chambers are provided adjacent the piston member, and one of the working chambers is adjacent a volume of pressurized gas. With such hydraulic or pneumatic height adjustment units one can continuously vary the effective length by opening the valve unit and fix a desired length by subsequent closing of the valve unit.

The guiding sleeve body may be located axially adjacent at least one end of the main sleeve body, e. g. the guiding sleeve body may be provided adjacent a first end of the main sleeve body which is more remote from the second end of the base tube. Alternatively, respective guiding sleeve bodies may be provided adjacent both ends of the main sleeve body.

The main sleeve body may have radially outer surface means radially engaged with an internal surface of the base tube.

The main sleeve body may be axially fixed with respect to the base tube. e.g., the main sleeve body may be axially fixed with respect to the base tube against movement toward the second end thereof by abutment means of the main sleeve body engaging the second end of the base tube. Moreover, the main sleeve body may be axially secured against movement away from the second end of the base tube by releasable securing means.

According to a preferred embodiment, the at least one guiding sleeve body comprises a substantially cylindrical guiding tube member with an inner circumferential guiding surface slidingly engaging the substantially cylindrical external surface of the first height adjustment component and an outer circumferential surface adjacent an inner substantially cylindrical surface of the main sleeve body. In such an embodiment the substantially cylindrical guiding tube member may be provided adjacent a respective end of the main sleeve body with at least one radially outward projecting positioning projection. This positioning projection may engage into a respective recess of the main sleeve body axially adjacent a respective end of the main sleeve body.

In this embodiment, the guiding sleeve body is circumferentially positioned with respect to the main sleeve body. Simultaneously, the main sleeve body may be secured against rotation with respect to the base tube. Under these circumstances, rotation is only possible at the interface between the first height adjustment component and the guiding tube member, where one can easily select a reduced friction providing a desired frictional torque.

Alternatively, the at least one projection can also be provided by the main sleeve body, and correspondingly, the recess may be provided by the guiding sleeve body. It is preferred, however, to have the projection or the projections on the radially outer side of the guiding sleeve body in order to have the very best sliding behaviour between the first height adjustment component and the guiding sleeve body. In this case, a precalibration of the guiding sleeve body is easily possible with the advantageous result that after assembling the guiding sleeve body and the main sleeve body and also after inserting this preassembly into the base tube no further calibration of the inner circumferential guiding surface of the guiding sleeve body is necessary.

For obtaining the above-mentioned snapping engagement between the main sleeve body and the at least one guiding sleeve body the snapping engagement means of one of the main sleeve body and the at least one guiding sleeve body may comprise sloped deflection face means inclined with respect to the axis and snapping shoulder means adjacent an axial end of the sloped deflection face means. Then, the snapping engagement means of the other one of the main sleeve body and the guiding sleeve body may be resiliently deflectable by engagement with the sloped deflection face means in response to an axial positioning movement of the guiding sleeve body with respect to the main sleeve body and engageable behind the shoulder means in an operational position of the guiding sleeve body with respect to the main sleeve body.

The at least one positioning projection of the guiding sleeve body may be provided with the sloped deflection face means and the snapping shoulder means. With such a design, the recess may be provided with a radially inward directed engagement web deflectable by the sloped deflection face means in response to axially approaching the guiding sleeve body to an operational position of the guiding sleeve body with respect to the main sleeve body. Then, the engagement web may snap behind the shoulder face means, when the operational position is achieved.

Alternatively, the snapping engagement means may be provided circumferentially outside the at least one positioning projection and the respective recess, respectively, adjacent respective axial ends of the main sleeve body and the guiding sleeve body. This alternative design is preferably used for positioning a guiding sleeve body at the lower end of the main sleeve body, whereas the snapping engagement between the positioning projection and the recess is preferably used for a guiding sleeve body inserted at the upper end of the main sleeve body.

The main sleeve body and the guiding sleeve body may be provided with abutment means abutting each other, when the respective snapping engagement means have snappingly engaged each other. Thus, the at least one guiding sleeve body can be easily fixed in both axial direction with respect to the main sleeve body.

The main sleeve body and the guiding sleeve body are preferably made of plastics material, particularly by injection moulding. For reducing the plastics material needed for moulding the main sleeve body and the at least one guiding sleeve body one uses the usual weight reducing measures of plastics moulding techniques. E. g., one may provide the main sleeve body with ribs on its radially outer side, which ribs may be annular ribs or axially extending ribs. In each case, the ribs may engage the inner circumferential face of the base tube. Moreover, all those usual measures may be used which allow the respective moulding tools to be manufactured in a most easy and economic way.

The main sleeve body and the guiding sleeve body may be made of different plastics material. The guiding sleeve body may be made of a material having improved sliding behaviour with respect to the substantially cylindrical external surface of the first height adjustment component. As a result of such a design, the total cost for manufacturing the guiding sleeve unit is considerably reduced taking into consideration that the material with the best sliding behaviour is generally more expensive than other materials. Moreover, it is to be considered that a material of desired high mechanical stability for the main sleeve body can be combined with a material of best sliding behaviour for the guiding sleeve bodies. The guiding sleeve body may be made of homogenous material. It may be mixed, however, also with particles providing the desired sliding properties. Moreover, the guiding sleeve body may be made of layers of different materials with the radially innermost layer being made of the material having best sliding properties.

The guiding sleeve body, the main sleeve body and the base tube may be dimensioned with respect to each other in radial dimensions such that even under consideration of manufacturing tolerances radial play of the first height adjustment component with respect to the base tube is substantially avoided, on the one hand, and clamping of the first height adjustment component with respect to the guiding sleeve body is avoided, on the other hand, such that no further calibration of the inner circumferential surface of the guiding sleeve body is necessary after insertion into the base tube.

For the avoiding of a post-calibration it is of special importance that both the main sleeve body and the at least one guiding sleeve body have relatively simple shape which can easily be produced. The simple shapes of the sleeve bodies allow to use moulding tools of equally simple shape which can be manufactured with high precision at low cost.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 1:
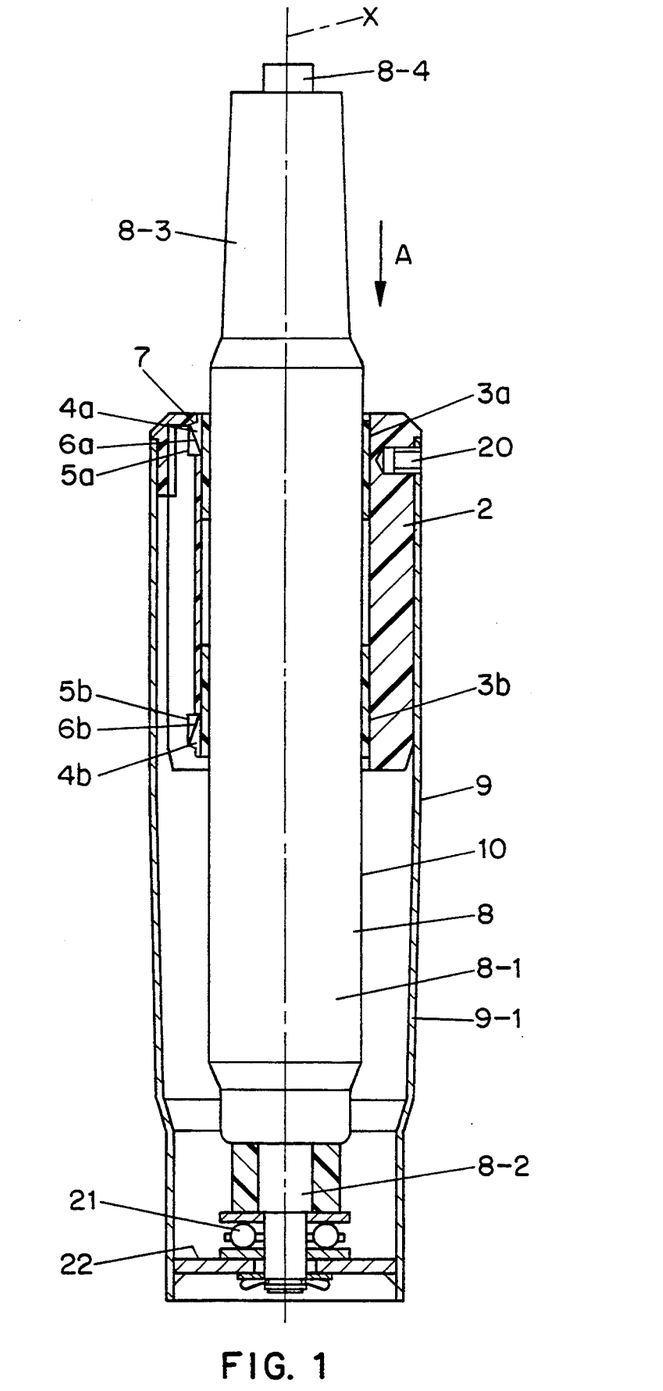
FIG. 1 shows a partial longitudinal section through a vertically adjustable chair column.

FIG. 1 shows and describes the guiding sleeve unit 1 for the guidance of telescoping cylindrical parts of a chair column. The chair column consists of a gas spring 8 whose downwardly directed piston rod 8-2 is axially fastened in a bottom portion of a base tube 9 but is movable in circumferential direction. At the upper end, the base tube 9 is provided with the guiding sleeve unit 1; the guiding sleeve unit 1 consists of one main sleeve body 2 and two guiding sleeve bodies 3a and 3b. The cylindrical outer face 10 of the gas spring cylinder 8-1 makes a sliding movement when the gas spring 8 is vertically adjusted or when it is elastically compressed. It is, as shown in FIG. 1, easily possible to seccessively arrange a plurality of guiding sleeve bodies within the main sleeve body 2.

The main sleeve body 2 has in its two terminal portions recesses 5a and 5b into which projections 4a and 4b of the guiding sleeve bodies 3a and 3b engage. By means of the projections 4a, 4b and the recesses 5a,5b, an axially coherent guiding sleeve unit 1 is obtained which cannot be disassembled after the mounting of the gas spring 8; in this guiding sleeve unit, the guiding sleeve bodies 3a,3b are undetachably held in the main sleeve body 2.

Figure 2:
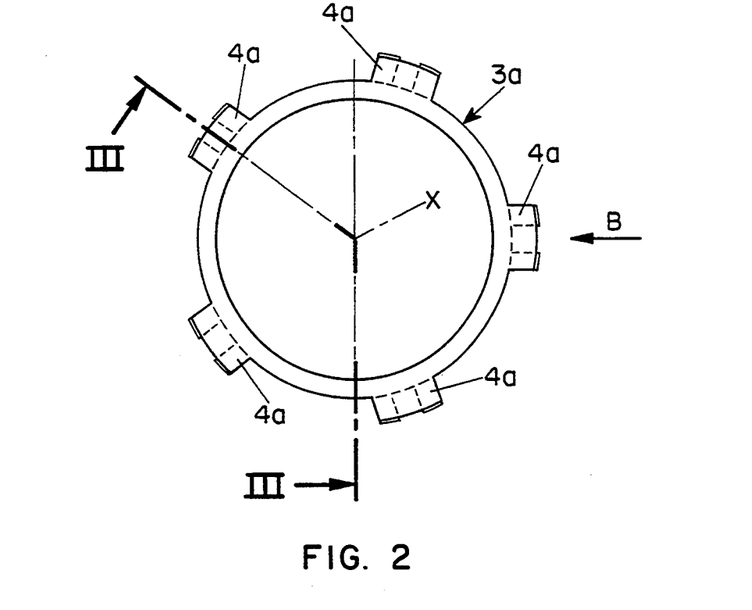
FIG. 2 shows an end view of a guiding sleeve body as seen in the direction A of FIG. 1.
Figure 3:
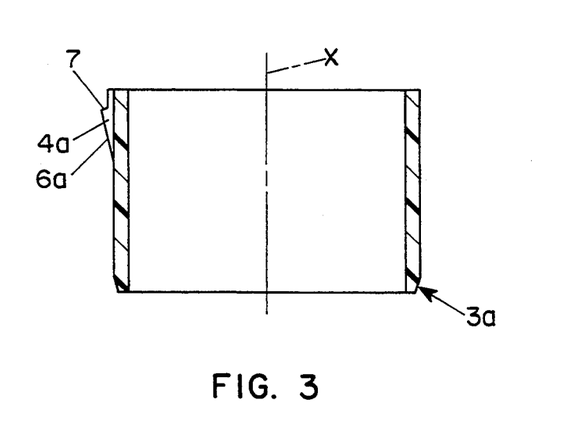
FIG. 3 shows a longitudinal section through the guiding sleeve body according to line III—III of FIG. 2.
Figure 4:
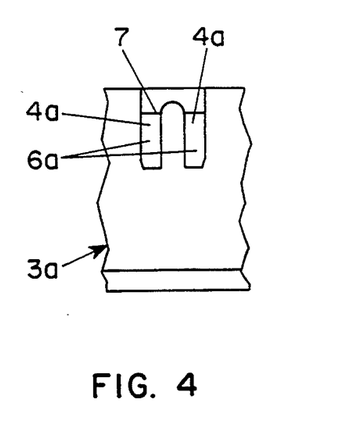
FIG. 4 shows a partial side view of the guiding sleeve body in the direction B of FIG. 2.
Figure 5:
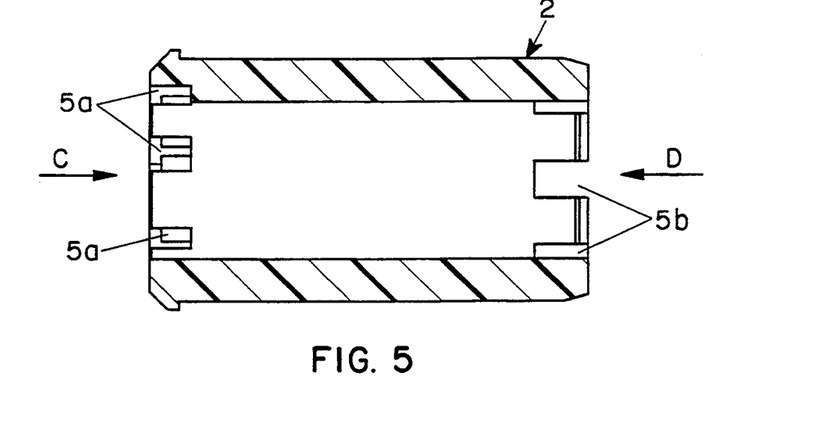
FIG. 5 shows a longitudinal section of the main sleeve body taken along the lines V—V of FIG. 7.
Figure 6:
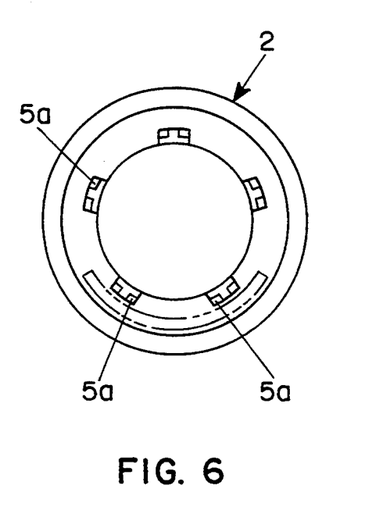
FIG. 6 shows an end view of the main sleeve body as seen in the direction C of FIG. 5.
Figure 7:
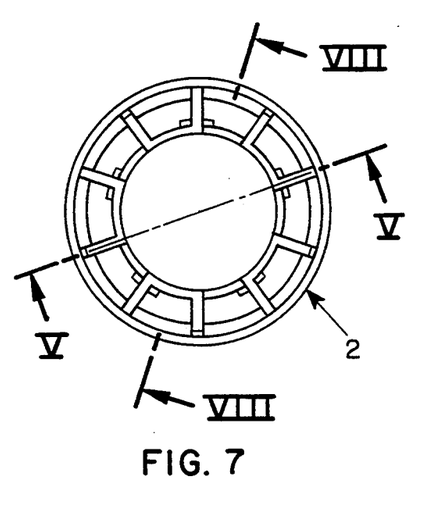
FIG. 7 shows an end view of the main sleeve body in the direction D of FIG. 5.

FIGS. 2 to 4 show a guiding sleeve body 3a as a component part. In FIG. 2, a plurality of projections 4a are peripherally distributed. As seen in FIGS. 2 and 4, the projections may be arranged pairwise adjacent each other. FIG. 3 shows the sloped face 6a which serves as entry help for the axial insertion into the main sleeve body 2 of FIG. 1, the face 7 which is approximately perpendicular to the axis X serves to achieve axial lock when the recesses 5a in the main sleeve body 2 have been reached and the projections 4a have thereafter come to engagement. The rectangularly extending face 7 engages either behind a counterface of the main sleeve body 2 or of the flanged end portion of the base tube 9 so that disassembling or loosening of the guiding sleeve body 3 is not possible when the gas spring 8 is in the assembled state.

FIGS. 5 to 8 show the main sleeve body 2. The terminal portions of this main sleeve body 2 are provided with recesses 5a and 5b which correspond to the projections 4a of the guiding sleeve body 3a and the projections 4b of the guiding sleeve body 3b. Although the main sleeve body 2 may be of uniform wall thickness over its entire circumference, except for the recesses described below, it is desirable, as in the embodiment shown in FIGS. 5 to 8, for the main sleeve body 2 to include an inner sleeve portion and several circumferentially spaced apart ribs that extend radially out from and longitudinally along Further details can be seen from FIGS. 9, 10 and 11 in which the main sleeve body and the guiding sleeve bodies are shown in more detail.

Figure 8:
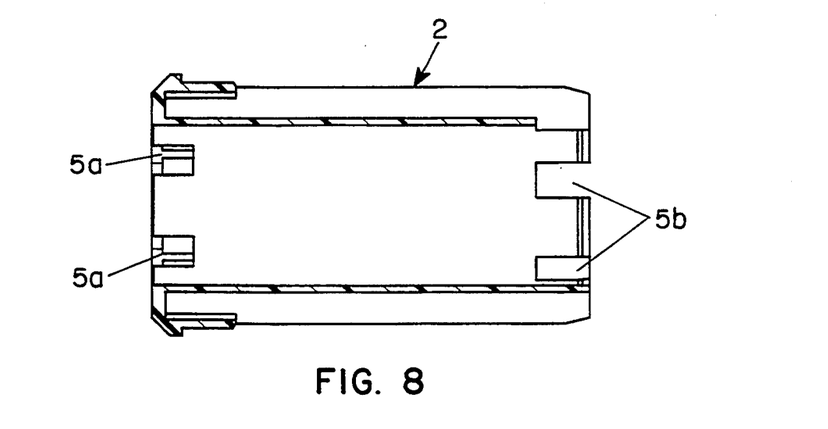
FIG. 8 shows a section through the main sleeve body according to line VIII—VIII of FIG. 7.
Figures 9, 11:
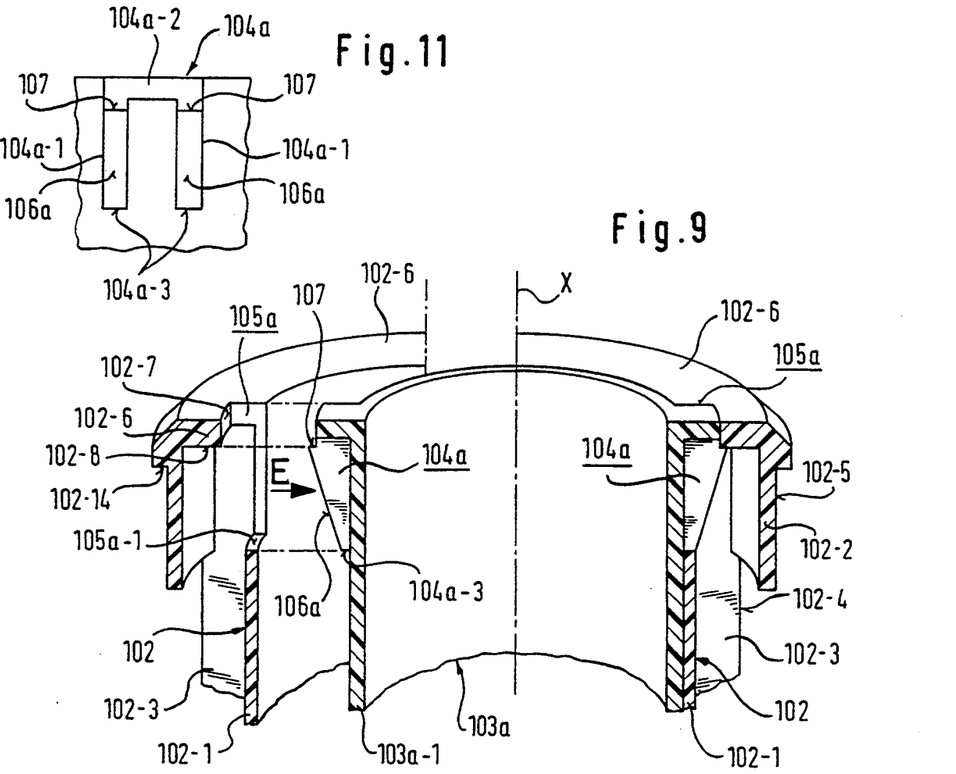
FIG. 9 shows the upper end portion of the guiding sleeve unit comprising a main sleeve body and a first guiding sleeve body with the main sleeve body and the guiding sleeve body being engaged in the right half of FIG. 9 and being radially separated from each other for illustration purposes in the left half of FIG. 9.
FIG. 11 shows a detail of the first guiding sleeve body as seen in the direction of the arrow E of FIG. 9.

From FIG. 9 one can see that the main sleeve body 102 comprises a radially inner shell 102-1 and a radially outer shell 102-2. The shell 102-1 extends along the total axial length of the guiding sleeve unit 1 as shown in FIG. 1. The radially outer shell 102-2 extends only over an upper part of the guiding sleeve unit 1 as shown in FIGS. 1 and 8. The radially inner shell 102-1 and the radially outer shell 102-2 are interconnected by ribs 102-3 which are substantially parallel to planes containing the axis X. The radially outer edges 102-4 of the ribs 102-3 are flush with the radially outer surface 102-5 of the shell 102-2. The radially outer edges 102-4 of the ribs 102-3 and the radially outer surface 102-5 of the radially outer shell 102-2 are in centering contact with the radially inner circumferential surface 9-1 of the base tube 9 as shown in FIG. 1. At the upper end of the main sleeve body 102 the radially inner shell 102-1 and the radially outer shell 102-2 are bridged by an integral terminal ring 102-6, which abuts by a face 102-14 the upper end of the base tube 9.

One can further see in FIG. 9 an upper guiding sleeve body 103a. This upper guiding sleeve body 103a comprises a guiding tube 103a1 which is provided with radial projections 104a: The radial projections 104a are shaped for engagement into recesses 105a. These recesses 105a are provided in the radially inner shell 102-1 and in the terminal ring 102-6 of the main sleeve body 102. The projections 104a are substantially U-shaped as shown in FIG. 11 with two legs 104a-1 and a middle portion 104a-2. The legs 104a-1 are provided with sloped faces 106a. At the upper ends of the sloped faces 106a there are provided shoulder faces 107. The upper guiding sleeve body 103a is inserted into the main sleeve body 102 in axial direction X from above with the projections 104a being angularly positioned such as to find into the respective recesses 105a. The sloped faces 106a are during this axial approach engaged with the edges 102-7 of the recesses 105a, which edges 102-7 are provided by the terminal ring 102-6. When the guiding sleeve body 103a achieves its operational position with respect to the main sleeve body 102 as shown in FIG. 11, the shoulder face 107 snaps below the lower face 102-8 of the terminal ring 102-6. The guiding sleeve body 103a is locked against upward movement with respect to the main sleeve body 102. Until this snapping effect occurs, either the sloped faces 106 are resiliently deflected in radially inward direction or the edges 102-7 are resiliently deflected in radially outward direction. When the shoulder face 107 is in contact with the lower face 102-8 of the terminal ring 102-6, the lower ends 104a-3 of the projection 104a are simultaneously in axial abutment with the lower edges 105a-1 of the recesses 105a provided by the radially inner shell 102-1. Thus, the guiding sleeve body 103a is fixed in both axial directions along the axis X against axial movement. Simultaneously, the guiding sleeve body 103a is prevented from rotation with respect to the main sleeve body 102. One can see from FIGS. 9 and 11 that the geometrical shapes of the main sleeve body 102 and the guiding sleeve body 103a are simple shapes. This is particularly true for the guiding sleeve body 103a. It is therefore easy to manufacture the guiding sleeve body 103a with precise shaping which does not require a post-calibration after the guiding sleeve body 103a has been inserted and snapped into the main sleeve body 102.

Figure 10:
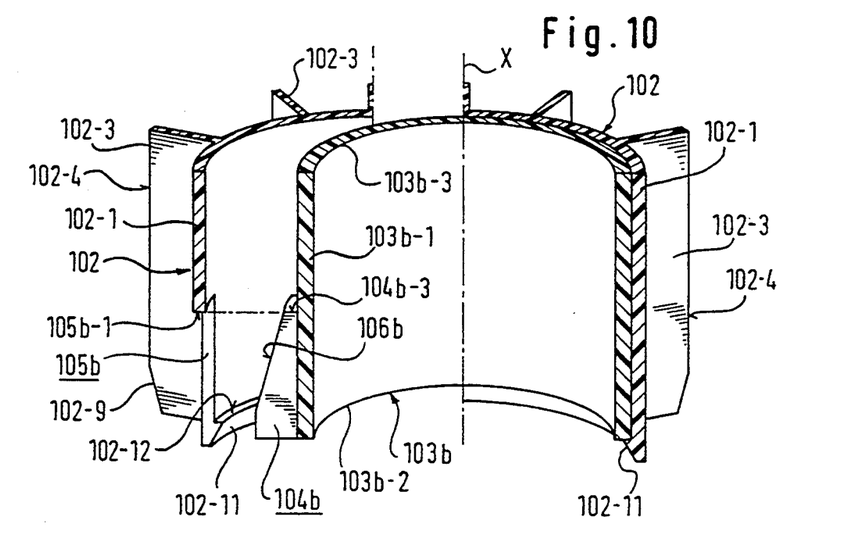
FIG. 10 shows the lower end portion of the guiding sleeve unit comprising again the main sleeve body and a second guiding sleeve body with the main sleeve body and the guiding sleeve body being engaged ind the right half of FIG. 10 and being radially separated from each other for illustration purposes in the left half of FIG. 10

In FIG. 10, one recognizes again the inner shell 102-1 of the main sleeve body 102 and the ribs 102-3 integrally moulded together with the inner shell 102-1. One can further see that the ribs 102-3 are provided at their lower ends with sloped edge portions 102-9 which facilitate the insertion of the main sleeve body 102 into the base tube which is shown in FIG. 1 at 9. One can further recognize in FIG. 10 the lower or second guiding sleeve body 103b which is inserted into the main sleeve body 102 by axial movement from below along the axis X. In FIG. 10, there is shown—as in FIG. 9—in the right half the guiding sleeve body 103b in engagement with the inner shell 102-1, whereas in the left half of FIG. 10 the shell 102-1 has been moved to the left for illustration purposes. One recognizes in FIG. 10 that the lower guiding sleeve body 103b has a cylindrical guiding tube member 103b-1 with integral radial projections 104b. These projections 104b are inserted into the recesses 105b provided at the lower end of the inner shell 102-1 of the main sleeve body 102. Between subsequent recesses 105b of the inner shell 102-1 the inner shell 102-1 is provided with conically sloped faces 102-11. When the lower guiding sleeve body 103b is inserted into the lower end of the main sleeve body 102, the projections 104b are angularly oriented such that they find into the recesses 105b. The projections 104b are provided with sloped faces 106b which facilitate the insertion of the guiding sleeve body 103b into the main sleeve body 102. When the guiding sleeve body 103b is inserted from below into the main sleeve body 102, the cylindrical guiding tube 103b-1 engages the conically sloped face 102-11 which facilitates the introduction of the upper edge 103b-3 of the guiding tube 103b-1. The conically sloped face segments 102-11 are elastically deflected in radially outward direction. Only when the guiding sleeve body 103b has reached its operational position with respect to the main sleeve body 102, the lower edge 103b-2 of the guiding tube 103b-1 snaps behind the shoulder face 102-12 so that the guiding sleeve body 103b is secured in downward direction with respect to the main sleeve body 102. Simultaneously, the upper end 104b-3 of the projection 104b abuttingly engages the bottom edge 105b-1 of the recess 105b such that the guiding sleeve body 103b is axially secured in both axial directions with respect to the main sleeve body 102. Simultaneously, the guiding sleeve body 103b is angularly secured with respect to the main sleeve body 102 by the engagement of the projection 104b into the recesses 105b.

When both guiding sleeve bodies 103a and 103b have been inserted into the main sleeve body 102, the guiding sleeve unit is completely preassembled and can be inserted into the base tube 9 as shown in FIG. 1. After insertion of the guiding sleeve unit 1 into the base tube 9, the guiding sleeve bodies 103a and 103b are non-releasably fixed with respect to the main sleeve body 102 by contact of the main sleeve body 102 with the inner surface 9-3 of the base tube 9. The guiding sleeve unit can be fixed as shown in FIG. 1 with respect to the base tube 9 by a screw or bolt 20. Thereafter, the gas spring 8 can be inserted into the base tube 9. The cylinder 8-1 of the gas spring 8 is now guided by its external cylindrical surface 10 at the upper end of the base tube 9 by the guiding sleeve unit 1. The lower end of the piston rod 8-2 is rotatably supported by a ball bearing 21 on a support bottom 22 of the base tube 9. The base tube 9 is provided with a conical section 9-1 for being fixed in a conical hole of a chair's bottom plate or bottom cross. The cylinder 8-1 or a protection tube surrounding the cylinder is provided with a conical upper end 8-3 on which a seat plate may be secured. A control element 8-4 extends beyond the upper end of the cylinder 8-1. This control element 8-4 can be moved downwards for permitting axial movement of the cylinder 8-1 with respect to the piston rod 8-2 as described in U.S. Pat. No. 4,848,524. After releasing the control element 8-4, the desired length is selected and fixed. The gas spring 8 and the seat plate (not shown) fixed thereto can, however, rotate with respect to the base tube 9.

While specific embodiments of the invention have been shown and described in detail to illustrate the application of the inventive principles, it will be understood that the invention may be embodied otherwise without departing from such principles.

We claim:

1. A column unit comprising a base tube having an axis, a first end and a second end, support means adjacent said second end, a height adjusting unit partially inside said base tube, said height adjusting unit having a first height adjusting component extending along said axis inward and outward of said first end of said base tube and further having a second height adjustment component, said second height adjustment component being substantially axially fixed with respect to said support means and said first height adjustment component being selectively axially movable with respect to said second height adjustment component among a plurality of fixed axial positions with respect to said second height adjustment component, said first height adjustment component having a substantially cylindrical external surface along at least a part of its axial length, said base tube being provided adjacent its first end with a guiding sleeve unit, said first height adjustment component being slidingly guided for at least one of axial and rotational movement by said guiding sleeve unit, said guiding sleeve unit comprising a main sleeve body and at least one guiding sleeve body substantially radially inside of said main sleeve body and slidingly engaging said substantially cylindrical external surface of said first height adjustment component, said at least one guiding sleeve body being axially secured with respect to said main sleeve body in an operating position with respect thereto by snapping engagement means of said main sleeve body and said guiding sleeve body snappingly engaging each other in response to axially sliding said guiding sleeve body inwards with respect to said main sleeve body toward said operating position, said snapping engagement means providing a considerably increased resistance force against withdrawal of said guiding sleeve body away from said operating position in an outward direction with respect to said main sleeve body as compared with a force required for axially sliding said guide sleeve body inwards with respect to said main sleeve body toward said operating position.

2. A column unit comprising a base tube having an axis, a first end and a second end, support means adjacent said second end, a height adjusting unit partially inside said base tube, said height adjusting unit having a first height adjusting component extending along said axis inward and outward of said first end of said base tube and further having a second height adjustment component, said second height adjustment component being substantially axially fixed with respect to said support means and said first height adjustment component being selectively axially movable with respect to said second height adjustment component among a plurality of fixed axial positions with respect to said second height adjustment component, said first height adjustment component having a substantially cylindrical external surface along at least a part of its axial length, said base tube being provided adjacent its first end with a guiding sleeve unit, said first height adjustment component being slidingly guided for at least one of axial and rotational movement by said guiding sleeve unit, said guiding sleeve unit comprising a main sleeve body and at least one guiding sleeve body substantially radially inside of said main sleeve body and slidingly engaging said substantially cylindrical external surface of said first height adjustment component, said at least one guiding sleeve body being axially secured with respect to said main sleeve body in an operating position with respect thereto by snapping engagement means of said main sleeve body and said guiding sleeve body snappingly engaging each other in response to axially sliding said guiding sleeve body inwards with respect to said main sleeve body towards said operating position, said snapping engagement means providing a considerably increased resistance force against withdrawal of said guiding sleeve body away from said operating position in an outward direction with respect to said main sleeve body as compared with a force required for axially sliding said guide sleeve body inwards with respect to said main sleeve body toward said operating position, said operating position being defined by abutment means of said main sleeve body and said guide sleeve body abutting each other in response to said axially sliding of said guiding sleeve body towards said operating position, when said snapping engagement has been established or shortly thereafter.

3. A column unit comprising a base tube having an axis, a first end and a second end, support means adjacent said second end, a height adjusting unit partially inside said base tube, said height adjusting unit having a first height adjusting component extending along said axis inward and outward of said first end of said base tube and further having a second height adjustment component, said second height adjustment component being substantially axially fixed with respect to said support means and said first height adjustment component being selectively axially movable with respect to said second height adjustment component among a plurality of fixed axial positions with respect to said second height adjustment component, said first height adjustment component having a substantially cylindrical external surface along at least a part of its axial length, said base tube being provided adjacent its first end with a guiding sleeve unit, said first height adjustment component being slidingly guided for at least one of axial and rotational movement by said guiding sleeve unit, said guiding sleeve unit comprising a main sleeve body and at least one guiding sleeve body substantially radially inside of said main sleeve body and slidingly engaging said substantially cylindrical external surface of said first height adjustment component, said at least one guiding sleeve body being axially secured with respect to said main sleeve body by snapping engagement means of said main sleeve body and said guiding sleeve body snappingly engaging each other in response to axial positioning of said guiding sleeve body with respect to said main sleeve body, said snapping engagement means of one of said main sleeve body and said at least one guiding sleeve body comprising sloped face means inclined with respect to said axis and snapping shoulder means adjacent an axial end of said sloped face means, said snapping engagement means of the other one of said main sleeve body and said guiding sleeve body being engageable behind said snapping shoulder means in an operational position of said guiding sleeve body with respect to said main sleeve body, at least one of said sloped face means and said snapping engagement means of said other one of said main sleeve body and said guiding sleeve body being resiliently deflectable in a radial direction.

4. A column unit comprising a base tube having an axis, a first end and a second end, support means adjacent said second end, a height adjusting unit partially inside said base tube, said height adjusting unit having a first height adjusting component extending along said axis inward and outward of said first end of said base tube and further having a second height adjustment component, said second height adjustment component being substantially axially fixed with respect to said support means and said first height adjustment component being selectively axially movable with respect to said second height adjustment component among a plurality of fixed axial positions with respect to said second height adjustment component, said first height adjustment component having a substantially cylindrical external surface along at least a part of its axial length, said base tube being provided adjacent its first end with a guiding sleeve unit, said first height adjustment component being slidingly guided for at least one of axial and rotational movement by said guiding sleeve unit, said guiding sleeve unit comprising a main sleeve body and at least one guiding sleeve body substantially radially inside of said main sleeve body and slidingly engaging said substantially cylindrical external surface of said first height adjustment component, said at least one guiding sleeve body having a substantially cylindrical guiding tubular portion with an inner circumferential surface slidingly engaging said substantially cylindrical external surface of said first height adjustment component and an outer circumferential surface adjacent an inner substantially cylindrical surface of said main sleeve body, said substantially cylindrical guiding tube portion being provided adjacent a respective end of said main sleeve body with at least one radially outward projecting positioning projection, said positioning projection being integral with said guiding tube member and being engaged in a respective recess of said main sleeve body axially adjacent a respective end of said main sleeve body, said recess being substantially open in an axial direction at said respective end of said main sleeve body such as to allow entrance of said radially outward projecting positioning projection into said recess in response to axial insertion of said guiding tube member into said main sleeve body, said positioning projection and said recess accommodating said positioning projection forming a plug connection fastening the guiding sleeve body in the axial direction with respect to said main sleeve body.

5. A column unit as set forth in either claim 1 or 3, said guiding sleeve body being located axially adjacent at least one end of said main sleeve body.

6. A column unit as set forth in any one of claims 1, 3 and 4, said guiding sleeve body being provided adjacent a first end of said main sleeve body which is more remote from said second end of said base tube.

7. A column unit as set forth in any one of claims 1, 3 and 4, respective guiding sleeve bodies being provided adjacent both ends of said main sleeve body.

8. A column unit as set forth in any one of claims 1, 3 and 4, said main sleeve body having radially outer surface means radially engaged with an internal surface of said base tube.

9. A column unit as set forth in any one of claims 1, 3 and 4, said main sleeve body being axially fixed with respect to said base tube.

10. A column unit as set forth in claim 9, said main sleeve body being axially fixed with respect to said base tube against movement toward the second end thereof by abutment means of said main sleeve body engaging the second end of said base tube.

11. A column unit as set forth in claim 9, said main sleeve body being axially secured against movement away from said second end of said base tube by releasable securing means.

12. A column unit as set forth in either claim 1 or 3, said at least one guiding sleeve body comprising a substantially cylindrical guiding tube member with an inner circumferential surface slidingly engaging said substantially cylindrical external surface of said first height adjustment component and an outer circumferential surface adjacent an inner substantially cylindrical surface of said main sleeve body, said substantially cylindrical guiding tube member being provided adjacent a respective end of said main sleeve body with at least one radially outward projecting positioning projection, said positioning projection engaging into a respective recess of said main sleeve body axially adjacent a respective end of said main sleeve body.

13. A column unit as set forth in claim 4, said at least one positioning projection of said guiding sleeve body being provided with sloped face means and snapping shoulder means, said recess being provided with a radially inward directed engagement web engageable by said sloped face means in response to axially approaching said guiding sleeve body to an operational position of said guiding sleeve body with respect to said main sleeve body, said engagement web snapping behind said snapping shoulder means in said operational position.

14. A column unit as set forth in claim 12, said at least one positioning projection of said guiding sleeve body being provided with sloped face means and snapping shoulder means, said recess being provided with a radially inward directed engagement web engageable by said sloped face means in response to axially approaching said guiding sleeve body to an operational position of said guiding sleeve body with respect to said main sleeve body, said engagement web snapping behind said snapping shoulder means in said operational position.

15. A column unit as set forth in claim 4, said snapping engagement means being provided circumferentially, outside said at least one positioning projection and said recess, respectively, adjacent respective axial ends of said main sleeve body and said guiding sleeve body.

16. A column unit as set forth in claim 4, said snapping engagement means being provided circumferentially, outside said at least one positioning projection and said recess, respectively, adjacent respective axial ends of said main sleeve body and said guiding sleeve body.

17. A column unit as set forth in any one of claims 1, 2, 3 and 4, said main sleeve body and said at least one guiding sleeve body being made of plastics material.

18. A column unit as set forth in claim 17, said main sleeve body and said at least one guiding sleeve body being made of different plastics material, said guiding sleeve body being made of a material having improved sliding behavior with respect to said substantially cylindrical external surface of said first height adjustment component.

19. A column unit as set forth in any one of claims 1, 3 and 4, said at least one guiding sleeve body, said main sleeve body and said base tube being dimensioned with respect to each other in radial dimension such that even under consideration of manufacturing tolerances radial play of the first height adjustment component with respect to the base tube is substantially avoided, on the one hand, and clamping of the first height adjustment component with respect to the guiding sleeve body is avoided, on the other hand, such that no further calibration of the inner circumferential surface of the guiding sleeve body is necessary after insertion into the base tube.

20. A column unit comprising a base tube having an axis, a first end and a second end, support means adjacent said second end, a height adjusting unit partially inside said base tube, said height adjusting unit having a first height adjusting component extending along said axis inward and outward of said first end of said base tube and further having a second height adjustment component, said second height adjustment component being substantially axially fixed with respect to said support means and said first height adjustment component being selectively axially movable with respect to said second height adjustment component among a plurality of fixed axial positions with respect to said second height adjustment component, said first height adjustment component having a substantially cylindrical external surface along at least a part of its axial length, said base tube being provided adjacent its first end with a guiding sleeve unit, said first height adjustment component being slidingly guided for at least one of axial and rotational movement by said guiding sleeve unit, said guiding sleeve unit comprising a main sleeve body and at least one guiding sleeve body substantially radially inside of said main sleeve body and slidingly engaging said substantially cylindrical external surface of said first height adjustment component, said at least one guiding sleeve body being axially secured with respect to said main sleeve body by snapping engagement means of said main sleeve body and said guiding sleeve body snappingly engaging each other in response to axial positioning of said guiding sleeve body with respect to said main sleeve body, said at least one guiding sleeve body including a substantially cylindrical guiding tube member with an inner circumferential surface slidingly engaging said substantially cylindrical external surface of said first height adjustment component and an outer circumferential surface adjacent an inner substantially cylindrical surface of said main sleeve body, said substantially cylindrical guiding tube member being provided adjacent a respective end of said main sleeve body with at least one radially outward projecting positioning projection, said positioning projection engaging into a respective recess of said main sleeve body axially adjacent a respective end of said main sleeve body, and said at least one positioning projection of said guiding sleeve body being provided with sloped face means and snapping shoulder means, said recess being provided with a radially inward directed engagement web engageable by said sloped face means in response to axially approaching said guiding sleeve body to an operational position of said guiding sleeve body with respect to said main sleeve body, said engagement web snapping behind said snapping shoulder means in said operational position.

* * * * *

UNITED STATES PATENT AND TRADEMARK OFFICE
CERTIFICATE OF CORRECTION

PATENT NO. : 5,443,573
DATED : August 22, 1995
INVENTOR(S) : Harry Thiele, Rainer Neuer and Hans-Josef Hosan It is certified that error appears in the above-indentified patent and that said Letters Patent is hereby corrected as shown below:

<u>Col. 7, line 10</u>, "along" should read --along the sleeve portion. Such a construction reduces the amount of plastic required for the main sleeve body 2.--

Signed and Sealed this

Nineteenth Day of December, 1995

Attest:

BRUCE LEHMAN

Attesting Officer     Commissioner of Patents and Trademarks